US006733885B2

(12) United States Patent
Kincart

(10) Patent No.: US 6,733,885 B2
(45) Date of Patent: May 11, 2004

(54) METHOD FOR FABRICATING IMPROVED GRAPHITE-CONTAINING GASKETS

(76) Inventor: Mark S. Kincart, 20133 E. Kino, Mayer, AZ (US) 86333

( * ) Notice: Subject to any disclaimer, the term of this patent is extended or adjusted under 35 U.S.C. 154(b) by 0 days.

(21) Appl. No.: 10/081,403

(22) Filed: Feb. 21, 2002

(65) Prior Publication Data

US 2002/0182414 A1 Dec. 5, 2002

Related U.S. Application Data

(60) Provisional application No. 60/270,393, filed on Feb. 21, 2001.

(51) Int. Cl.$^7$ ............................................. B32B 9/00
(52) U.S. Cl. .................. 428/408; 428/457; 428/133; 428/614; 428/621; 277/591; 277/595
(58) Field of Search .................. 428/99, 133, 337, 428/457, 920, 408, 323, 137, 174, 614, 621; 277/595, 591, 592, 938, 626, 627, 910

(56) References Cited

U.S. PATENT DOCUMENTS

| 3,784,212 | A | * | 1/1974 | Doerfling |
| 3,841,289 | A | * | 10/1974 | Meyers |
| 4,776,602 | A | * | 10/1988 | Gallo |
| 4,911,972 | A | * | 3/1990 | Mercuri ........................ 428/99 |
| 5,310,197 | A | * | 5/1994 | Bruch et al. |
| 5,951,021 | A | * | 9/1999 | Ueta ........................... 277/593 |

* cited by examiner

Primary Examiner—Deborah Jones
Assistant Examiner—Abraham Bahta
(74) Attorney, Agent, or Firm—Snell & Wilmer L.L.P.

(57) ABSTRACT

A gasket for an internal combustion engine having a bottom copper layer, a graphite layer overlying the bottom copper layer, an aluminum layer overlying the graphite layer, and a second graphite layer overlying the aluminum layer. The bottom copper layer is then folded over an interior circumference or perimeter of the gasket to form a copper lip. A top copper layer may also be formed over the second graphite layer prior to forming the copper lip.

4 Claims, 1 Drawing Sheet

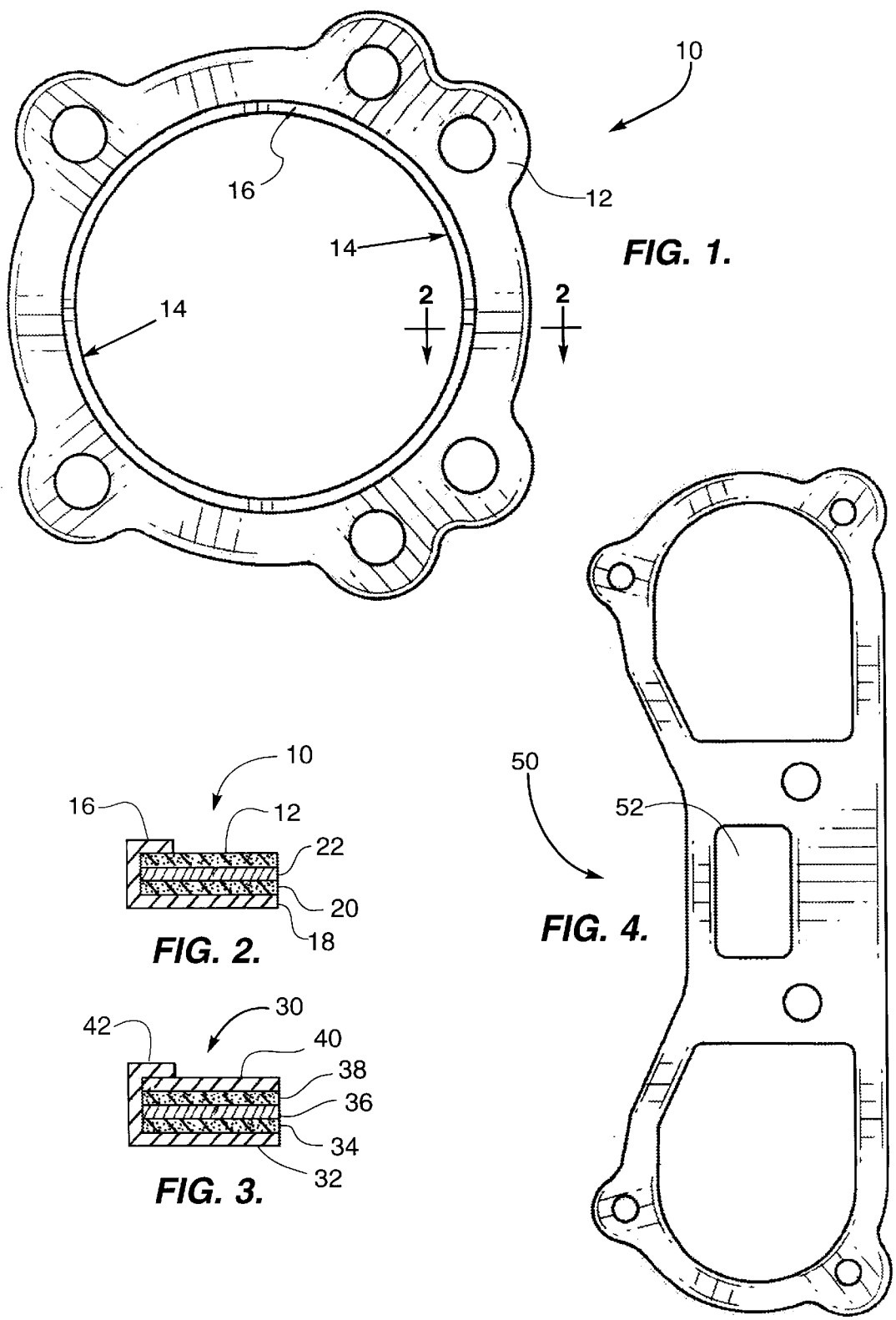

METHOD FOR FABRICATING IMPROVED GRAPHITE-CONTAINING GASKETS

CROSS REFERENCE TO RELATED APPLICATION

This application claims the benefit of, and priority to, provisional application Serial No. 60/270,393, filed Feb. 21, 2001, which application is hereby incorporated by reference in its entirety.

FIELD OF INVENTION

The present invention generally relates to gaskets for use in an internal combustion engine and a method for fabricating the same. More particularly, the present invention is directed to a multi-layer gasket for use in motorcycle engines.

BACKGROUND OF THE INVENTION

Head gaskets currently used in internal combustion engines, and in particular in engines for Harley Davidson motorcycle engines, are typically comprised of graphite with an aluminum liner around an inner circumference of the gasket and a polyethylene bead patterned on the aluminum liner which functions to enhance the seal of the gasket. However, the polyethylene bead has proven to actually inhibit a good seal because the graphite material which comprises the gasket cannot adequately bend around the polyethylene bead to form a tight seal.

Copper is more heat resistant than aluminum while still being formable and pliable to form a tight seal. Accordingly, many prior art gaskets have incorporated the use of a copper layer to aid in forming an effective seal such as those described in U.S. Pat. Nos. 4,836,158, 4,973,516, and 5,100,737. Still, adhesives are used with many gaskets having copper layers in order to create strong and effective seals.

Like the head gaskets described above, lower rocker box gaskets used in Harley Davidson motorcycle engines are also typically comprised of graphite. Lower rocker box gaskets also typically include tabs which extend from an inner aperture located in the center of the gasket which are folded onto the engine in order to position and help seal the gasket. The tabs function to assist sealing of the gasket without the use of an adhesive. The use of such tabs, as well as the use of adhesives and head gaskets requires more tooling and/or more steps in the manufacture of the gaskets and their application as used in internal combustion engines.

Accordingly, there is a need for an improved gasket which does not require the use of adhesives or tabs to create a tight and effective seal in internal combustion engines.

SUMMARY OF THE INVENTION

The present invention is directed to an improved gasket for internal combustion engines which decreases tooling and/or manufacturing costs and improves performance.

The gasket of the present invention includes a copper base layer, a graphite layer overlying the copper base layer, an aluminum layer overlying the graphite layer, and a second graphite layer overlying the aluminum layer. In one aspect of the invention, the copper base layer is folded over an interior circumference of the gasket and onto the second graphite layer in order to form a copper lip over the internal circumference of the gasket.

In another aspect of the invention, a top copper layer is positioned over the second graphite layer and in still another aspect of the invention the bottom copper layer is folded over an inner circumference of the gasket and onto the top copper layer in order to form a copper lip over the internal circumference of the gasket.

In another embodiment of the invention, a lower rocker box gasket for a motorcycle engine is formed from any of the present invention gaskets previously described above but without any center tabs extending from an aperture contained in the gasket. These embodiments and aspects of the present invention result in a gasket having an improved seal without the need for tooling to create tabs and adhesive layers and/or beads in the gasket.

These and other objects and advantages of the invention, as well as the details of illustrative embodiments, will be more fully understood from the following specification and drawings.

BRIEF DESCRIPTION OF THE DRAWINGS

FIG. 1 is a top plan view of a first exemplary embodiment of the present invention;

FIG. 2 is a cross sectional view taken along line 2—2 of FIG. 1;

FIG. 3 is a cross sectional view of a second exemplary embodiment of the present invention; and FIG. 4 is a top plan view of a third exemplary embodiment of the present invention.

DETAILED DESCRIPTION

The present invention is directed to an improved gasket for use in internal combustion engines and, in particular, an improved gasket for use in Harley Davidson motorcycle engines. FIG. 1 is a top plan view of a first exemplary embodiment of the gasket of the present invention. Gasket 10 includes a top layer 12 comprised of graphite and a bottom copper layer that is folded over an interior circumference 14 of the gasket 10 and onto top layer 12 to form a copper lip 16 over inner circumference 14 of gasket 10.

FIG. 2 is a cross-section of FIG. 1 taken along line 2—2 of FIG. 1. FIG. 2 shows gasket 10 having a bottom copper layer 18, a first graphite layer 20 overlying bottom copper layer 18, an aluminum layer 22 overlying first graphite layer 20, and top graphite layer 12 overlying aluminum layer 22. Bottom copper layer 18 is folded over the inner circumference 14 of gasket 10 to form copper lip 16.

A cross sectional view of a second exemplary embodiment of the gasket of the present invention is shown in FIG. 3. FIG. 3 shows a gasket 30 having a bottom copper layer 32, a first graphite layer 34 overlying bottom copper layer 32, an aluminum layer 36 overlying first graphite layer 34, a second graphite layer 38 overlying aluminum layer 36, and a top copper layer 40 overlying second graphite layer 38. Bottom copper layer 32 is folded over the inner circumference of gasket 30 to form copper lip 42.

Turning now to FIG. 4, there is shown a lower rocker box gasket 50 which may comprise those embodiments previously discussed with reference to FIG. 2 or 3. However, lower rocker box gasket 50 has a center aperture 52 which does not contain any tabs or protrusions which can be bent or folded in order to assist in forming a seal. Such tabs and/or protrusions, although present in the prior art, are not necessary with the present invention due to the composition of the improved gasket and its ability to form a tight seal without such folded tabs or protrusions. The present invention also contemplates forming the lower rocker box gasket 50 shown in FIG. 4 from graphite with a bottom copper layer that is folded over any interior circumferences or perimeters contained within the gasket and onto the graphite layer to form copper lips around the interior circumferences or perimeters.

The gaskets described above with reference to FIGS. 1–4 may be formed by stamping the gaskets from the varying combinations of layered materials and then bending or folding the bottom copper layer over the inner circumference of the gasket by heating the copper layer to a temperature where it is pliable and formable. Alternatively, each layer may be stamped or formed separately in the desired shape of a gasket and then stacked. The stack of layers may also be heated to assist in bonding the layers.

Although exemplary embodiments of the invention have been shown and described above, it is to be understood that various modifications and substitutions may be made by those skilled in the art without departing from the spirit and scope of the invention. Accordingly, the invention is intended to embrace all modifications within the scope of the appended claims.

What is claimed is:

1. A gasket for use in an internal combustion engine comprising:
    a copper base layer;
    a first graphite layer positioned over the copper base layer;
    an aluminum layer positioned over the first graphite layer; and
    a second graphite layer positioned over the aluminum layer.

2. The gasket of claim 1 wherein said copper base layer is folded over an inner circumference of said gasket and onto the second graphite layer to form a copper lip over the inner circumference of the gasket.

3. The gasket of claim 1 further comprising
    a top copper layer positioned over the second graphite layer.

4. The gasket of claim 3 wherein said copper base layer is folded over an inner circumference of said gasket and onto the top copper layer of said gasket.

* * * * *